(12) United States Patent
Rehm

(10) Patent No.: US 7,688,719 B2
(45) Date of Patent: Mar. 30, 2010

(54) VIRTUALIZATION AND HIGH AVAILABILITY OF NETWORK CONNECTIONS

(75) Inventor: Werner Rehm, Heidelberg (DE)

(73) Assignee: SAP (AG), Walldorf (DE)

( * ) Notice: Subject to any disclaimer, the term of this patent is extended or adjusted under 35 U.S.C. 154(b) by 552 days.

(21) Appl. No.: 11/637,266

(22) Filed: Dec. 11, 2006

(65) Prior Publication Data

US 2008/0140846 A1 Jun. 12, 2008

(51) Int. Cl.
*G01R 31/08* (2006.01)
(52) U.S. Cl. ........................ 370/225; 370/217; 370/221; 709/227
(58) Field of Classification Search ................. 370/216, 370/225; 709/227
See application file for complete search history.

(56) References Cited

U.S. PATENT DOCUMENTS 6,122,363 A * 9/2000 Friedlander et al. ......... 379/230
6,324,177 B1 11/2001 Howes et al.
7,213,246 B1 * 5/2007 van Rietschote et al. ....... 718/1
2004/0187106 A1 * 9/2004 Tanaka et al. .................. 718/1
2006/0179147 A1 * 8/2006 Tran et al. .................... 709/227

OTHER PUBLICATIONS

PCT International Search Report, dated Apr. 11, 2008, International Application No. PCT/EP2007/010749, International Filing Date Oct. 12, 2007, 12 pgs.
Sun Microsystems, Inc., "Software Fault Tolerant Computer System", UK Patent Application, GB2353113, Application No. 9918987.0, Date of Filing Aug. 11, 19990, Publication Date Feb. 14, 2001, 60 pgs.

* cited by examiner

*Primary Examiner*—Jason E Mattis
*Assistant Examiner*—Kibrom T Hailu
(74) *Attorney, Agent, or Firm*—Blakely, Sokoloff, Taylor & Zafman, LLP

(57) ABSTRACT

A system and method for connection failover. A plurality of virtual machines connect to a proxy using a protocol library. The proxy establishes a connection to a gateway. A user context including a conversation identifier is stored. The proxy continues a conversation with a second virtual machine based on the conversation identifier and user context if a first virtual machine fails when the conversation is in a ready for failover state.

16 Claims, 2 Drawing Sheets

VIRTUALIZATION AND HIGH AVAILABILITY OF NETWORK CONNECTIONS

BACKGROUND

1. Field

Embodiments of the invention relate to network connections. More specifically, embodiments of the invention relate to a system and method to provide for failover of open network connections in the event of a virtual machine crash.

2. Background

Typically, network communication between the client on a virtual machine and a server occur over a socket connection. Unfortunately, in the event of a process or virtual machine crash, the socket connection is lost while user may have an expectation that the logical connection would continue. This is particularly problematic in the context of high availability systems where maintenance of the network connection is important for timely operation. This is due at least in part to the overhead associated with reestablishing a socket connection and reinitiating the conversation to return to the state prior to process or virtual machine failure.

SUMMARY OF THE INVENTION

A system and method for connection failover is disclosed. A plurality of virtual machines connect to a proxy using a protocol library. The proxy establishes a connection to a gateway. A user context including a conversation identifier is stored. The proxy continues a conversation with a second virtual machine based on the conversation identifier and user context if a first virtual machine fails when the conversation is in a ready for failover state.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
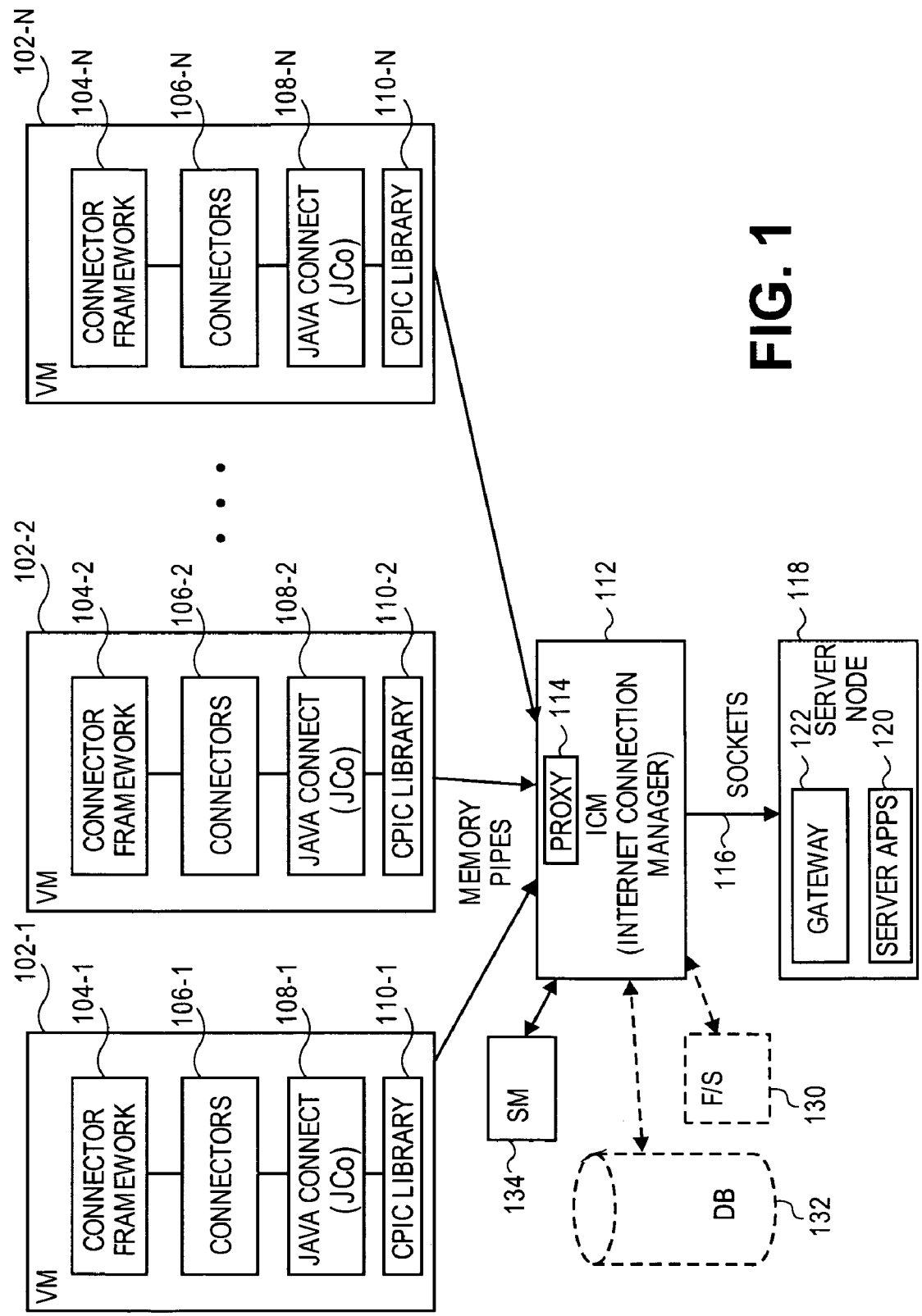
FIG. 1 is a block diagram of a system of one embodiment of the invention.

FIG. 1 is a block diagram of a system of one embodiment of the invention. A plurality of virtual machines 102-1, 102-2 through 102-N (generically 102), communicates with a proxy 114 in an internet connection manager (ICM 112) using, for example, a shared memory protocol, such as memory pipes. In one embodiment, the ICM 112 acts as a dispatcher for Hypertext Transfer Protocol (HTTP) requests. ICM 112 establishes a socket or transmission control protocol/internet protocol (TCP/IP) connection with the gateway 122 in the server node 118 to interact with various server applications 120. The ICM 112 retains the socket connection independent of the state of the VM 102 that may or may not communicate indirectly over the socket connection.

In one embodiment, each virtual machine includes a connector framework (104-1, 104-2, 104-N generically 104). Connector framework 104 provides connectors (106-1, 106-2, 106-N, generically 106). Among the connectors are Java connect (JCo)(108-1, 108-2, 108-N, generically 108). JCo 108 is analogous to a remote function call (RFC) in a Java environment. While the description of this embodiment is primarily made with reface to a Java environment, embodiment of the invention may reside in, for example, a .Net environment or any other client server environment employing connections for which failover is desirable.

JCo 108 communicates through a common programming interface communication (CPIC) library (110-1, 110-2, 110-N, generically 110). The CPIC library 110 is a standardized interface for system wide communication between programs. The CPIC library 110 is provided the proxy host and proxy port to permit communication with the proxy 114 rather than directly with the gateway 122. In one embodiment, a TCP/IP connection is established between the CPIC library 110 and the proxy 114. This connection is used for both messaging and to wakeup the ICM. In one embodiment, user data is exchanged between the VMs 102 and ICM 112 using memory pipes. In such an embodiment, both the VM and ICM run the same profile or at least the same instance number and shared memory layout.

A process executing on the VM 102 uses the connector framework 104, connectors 106, JCo 108 and CPIC library 110 to conduct a conversation with the server node, often using, for example, TCP/IP. The conversation is typically conducted using request/response pairs. For example, the client will request some data and the server will respond with that data, or the server will request data and the client will respond with the data. In one embodiment, each conversation has an associated conversation identifier (conversation ID), which is maintained in a session persistent memory, such as shared memory 134, database 132 or file system 130 in association with stated information about the conversation. The conversation ID serves as a handle for the conversation. In one embodiment, the conversation ID includes a network identifier, protocol version, header length, and security information. The conversation may be stored in a user context persisted to shared memory 134.

In this manner, if VM 102-1 is conducting a conversation via a proxy 114, and VM 102-1 crashes, if the state of the conversation is determined to be ready for failover, the proxy 114 can pass the conversation ID to one of the other VM's, e.g., 102-2, and continue the conversation uninterrupted from a user perspective. For example, if the conversation was ready for failover when the VM crashed, a new program is started, and tries to continue data exchange over the same connection, because the conversation id was persistently stored and survived the crash. With the next request, the CPIC library 110 tries to recover the previous connection context. A message is sent to the proxy 114 (with the conversation id as handle) and old state will be fetched and restored. If this is successful, the communication will continue and the end user will notice nothing, as if no crash of the old program occurred.

If the proxy 114 discerns that the conversation was not in a state that it was ready for failover, the connection is simply deleted. This may occur, for example, where the failure occurs between a request and response such that the conversational state cannot be fully discerned. Thus, the conversation is deemed ready or available for failover between request/response pairs, but not between a request and response of a single request/response pair. Thus, a previous SEND/RECEIVE cycle must be finished. In case of RFC/JCo this means that all results for a function module must be received. From the view of the CPIC communication, the conversation must receive the CM_SEND_RECEIVED state during CMRCV. In one embodiment, when the connection receives this state, a special message is sent to the proxy 114 to mark this connection as ready for failover.

If the conversation was marked ready for failover, and the proxy 114 attempts to establish communication with a second VM via, e.g., VM 102-2, but the attempted connection is not accepted within a certain time period, the proxy 114 times out and deletes the connection. In some embodiments, the timeout period may be configured by a system administrator. Because the ICM 112 can perform a handoff between VM's a significant percentage of the time, system availability is improved and latency associated with connection activity is reduced over prior systems.

Figure 2:
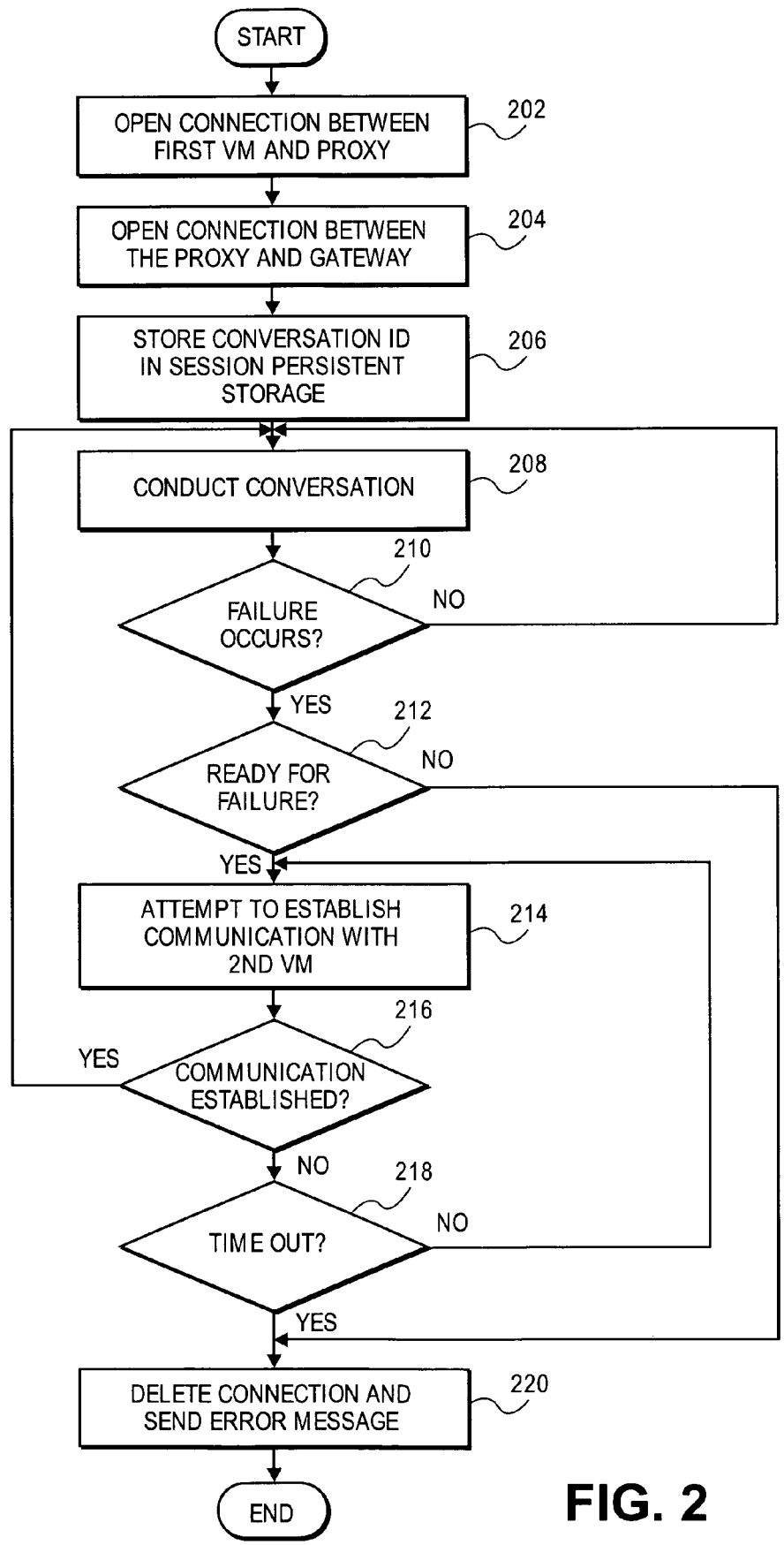
FIG. 2 is a flow diagram of operation in one embodiment of the invention.

FIG. 2 is a flow diagram of operation in one embodiment of the invention. At block 202, a connection is opened between a first VM and a proxy. In one embodiment, communication occurs using memory pipes. At block 204 a connection is open between the proxy and a gateway. In one embodiment, this connection may be established using sockets. A conversation ID is stored as a handle in session persistent storage at block 206. Session persistent storage may be, for example, shared memory, the file system or a database. A conversation is then conducted between the VM and the gateway via the proxy at block 208. At block 210, if a failure occurs, e.g., the VM or communicating process crashes, a determination is made at block 212 if the conversational state of the conversation is such that the conversation is ready for failover. If the conversation was ready for failover, the proxy will attempt to establish communication with a second VM at block 214 using, e.g., memory pipes. A determination is made at block 216 if communication was successfully established with a second VM. If it is, the conversation continues at block 208. If not, a determination is made whether a timeout has occurred at block 218. If a timeout has not yet occurred, the proxy continues to attempt to establish communication with a second VM. If a timeout has occurred, a connection is deleted and an error message is sent at block 220. Similarly, if the connection was not ready for failover at block 212, the connection is deleted and an error message is sent at block 220.

While the foregoing description uses a flow chart to illustrate operational flow, it is expected that some of the operations may occur in an order different than illustrated and in some cases various operations may occur in parallel. Thus, these different ordering and/or parallel operations are deemed within the scope and contemplation of various embodiments of the invention.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cares, or other type of machine-readable media suitable for storing electronic instructions. Furthermore, embodiments of the invention may be downloaded as a computer program which may be transferred from a remote computer (e.g., a server) to a requesting computer (e.g., a client) by way a propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to the specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
   initiating a conversation between a first virtual machine included on a client and an application included on a server, the conversation to include a request/response pair, the first virtual machine and the application to execute the conversation via an Internet Connection Manager (ICM);
   storing a conversation ID identifying the conversation between the first virtual machine and the application;
   in response to a failure of the first virtual machine during the conversation, determining the failure of the first virtual machine occurred outside the request/response pair; and
   in response to determining the failure of the first virtual machine occurred outside the request/response pair
      maintaining the connection from the ICM to the application,
      passing the conversation ID to a second virtual machine included on the client, and
      establishing communication between a second virtual machine included on the client and the ICM to continue the conversation.

2. The method of claim 1 further comprising:
   maintaining a user context including the conversation identifier from the first virtual machine in a persistent storage unit.

3. The method of claim 1, wherein initiating the conversation comprises:
   sending a message between the first virtual machine and the ICM using a shared memory protocol.

4. The method of claim 1 further comprising:
   deleting the connection in response to determining the failure of the first virtual machine occurred within the request/response pair.

5. The method of claim 1, wherein the first and second virtual machines communicate with the ICM via a memory pipe, and wherein the ICM and the server communicate via a socket.

6. The method of claim 1, wherein the conversation ID is stored in shared memory.

7. A machine-accessible storage medium containing instructions that when executed cause a machine to:
   initiate a conversation between a first virtual machine included on a client and an application included on a server, the conversation to include a request/response pair, the first virtual machine and the application to execute the conversation via an Internet Connection Manager (ICM);
   store a conversation ID identifying the conversation between the first virtual machine and the application;
   in response to a failure of the first virtual machine during the conversation, determine the failure of the first virtual machine occurred outside the request/response pair; and
   in response to determining the failure of the first virtual machine occurred outside the request/response pair maintain the connection from the ICM to the application, pass the conversation ID to a second virtual machine included on the client, and establish communication between a second virtual machine included on the client and the ICM to continue the conversation.

8. The machine accessible storage medium of claim 7, further comprising instructions causing the machine to:

maintain a user context including the conversation identifier from the first virtual machine in a persistent storage unit.

9. The machine accessible storage medium of claim 7, wherein the instructions causing the machine to initiate the conversation comprise instructions causing the machine to:

send a message between the first virtual machine and the ICM using a shared memory protocol.

10. The machine accessible storage medium of claim 7, further comprising instructions causing the machine to:

delete the connection in response to determining the failure of the first virtual machine occurred within the request/response pair.

11. The machine accessible storage medium of claim 7, wherein the first and second virtual machines communicate with the ICM via a memory pipe, and wherein the ICM and the server communicate via a socket.

12. The machine accessible storage medium of claim 7, wherein the conversation ID is stored in shared memory.

13. A system comprising:

a memory a server including an application;

a client device including a first virtual machine and a second virtual machine; and an Internet Connection Manager (ICM) to initiate a conversation between the first virtual machine and the application, the conversation to include a request/response pair, store a conversation ID identifying the conversation between the first virtual machine and the application in memory, in response to a failure of the first virtual machine during the conversation, determine the failure of the first virtual machine occurred outside the request/response pair, and in response to determining the failure of the first virtual machine occurred outside the request/response pair maintain the connection from the ICM to the application, pass the conversation ID to the second virtual machine, and establish communication between a second virtual machine included on the client and the ICM to continue the conversation.

14. The system of claim 13, wherein the first and second virtual machines communicate with the ICM via a memory pipe, and wherein the ICM and the server communicate via a socket.

15. The system of claim 13, wherein the conversation ID is stored in shared memory.

16. The system of claim 13, the ICM to further:

delete the connection in response to determining the failure of the first virtual machine occurred within the request/response pair.

* * * * *